United States Patent
Gupta et al.

(10) Patent No.: US 9,916,249 B2
(45) Date of Patent: Mar. 13, 2018

(54) SPACE ALLOCATION IN A MULTI-GRAINED WRITEBACK CACHE

(71) Applicant: International Business Machines Corporation, Armonk, NY (US)

(72) Inventors: Aayush Gupta, San Jose, CA (US); James L. Hafner, Pacific Grove, CA (US); Mohit Saxena, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/943,896

(22) Filed: Nov. 17, 2015

(65) Prior Publication Data
US 2017/0139834 A1    May 18, 2017

(51) Int. Cl.
*G06F 12/08* (2016.01)
*G06F 12/0871* (2016.01)
*G06F 12/0891* (2016.01)

(52) U.S. Cl.
CPC ...... *G06F 12/0871* (2013.01); *G06F 12/0891* (2013.01); *G06F 2212/154* (2013.01); *G06F 2212/604* (2013.01)

(58) Field of Classification Search
CPC .................. G06F 12/0871; G06F 2212/604
See application file for complete search history.

(56) References Cited

U.S. PATENT DOCUMENTS

| | | | |
|---|---|---|---|
| 5,724,501 A | 3/1998 | Dewey et al. | |
| 6,018,789 A * | 1/2000 | Sokolov | G06F 3/061 711/113 |
| 6,216,200 B1 | 4/2001 | Yeager | |
| 6,430,654 B1 | 8/2002 | Mehrotra et al. | |
| 6,961,814 B1 * | 11/2005 | Thelin | G06F 12/0866 710/52 |
| 8,095,734 B2 | 1/2012 | Lippert et al. | |
| 8,145,848 B2 | 3/2012 | Jain et al. | |
| 8,190,820 B2 | 5/2012 | Thantry et al. | |
| 8,566,534 B1 * | 10/2013 | Pruthi | G06F 12/0871 711/141 |
| 9,817,757 B2 | 11/2017 | Gupta et al. | |
| 2002/0133735 A1 | 9/2002 | McKean et al. | |

(Continued)

FOREIGN PATENT DOCUMENTS

WO    2010101754 A2    9/2010

OTHER PUBLICATIONS

Gupta et al., U.S. Appl. No. 14/943,872, filed Nov. 17, 2015.

(Continued)

*Primary Examiner* — Edward Dudek, Jr.
*Assistant Examiner* — Andrew Russell
(74) *Attorney, Agent, or Firm* — Zilka-Kotab, P.C.

(57) ABSTRACT

In one embodiment, a system includes a cache storage device and a processor and logic integrated with and/or executable by the processor. The logic is configured to receive a write request including data to be written to the cache storage device. The logic is also configured to determine a size of the write request. Moreover, the logic is configured to select a chunk size from among a plurality of chunk sizes designated for storing data in the cache storage device. In addition, the logic is configured to allocate a fine block descriptor (FBD) having the selected chunk size to the write request.

18 Claims, 12 Drawing Sheets

(56) References Cited

U.S. PATENT DOCUMENTS

| | | |
|---|---|---|
| 2004/0215900 A1 | 10/2004 | Guthrie et al. |
| 2008/0104326 A1 | 5/2008 | Cypher et al. |
| 2011/0066808 A1* | 3/2011 | Flynn .................. G06F 12/0246 711/118 |
| 2011/0093654 A1 | 4/2011 | Roberts et al. |
| 2011/0225372 A1 | 9/2011 | Pirog |
| 2012/0084278 A1 | 4/2012 | Franke et al. |
| 2012/0117323 A1 | 5/2012 | Cypher et al. |
| 2012/0159016 A1 | 6/2012 | Morita |
| 2012/0311271 A1* | 12/2012 | Klein .................. G06F 12/0873 711/141 |
| 2015/0193144 A1 | 7/2015 | Bilas et al. |
| 2015/0199272 A1 | 7/2015 | Goel et al. |
| 2016/0170878 A1* | 6/2016 | Trika .................. G06F 12/0886 711/118 |
| 2016/0283391 A1 | 9/2016 | Nilsson et al. |
| 2016/0335188 A1 | 11/2016 | Romanovskiy |
| 2017/0139792 A1 | 5/2017 | Gupta et al. |
| 2017/0139829 A1 | 5/2017 | Gupta et al. |
| 2017/0139830 A1 | 5/2017 | Gupta et al. |
| 2017/0139832 A1 | 5/2017 | Gupta et al. |

OTHER PUBLICATIONS

Gupta et al., U.S. Appl. No. 14/943,923, filed Nov. 17, 2015.
Gupta et al., U.S. Appl. No. 14/943,954, filed Nov. 17, 2015.
Gupta et al., U.S. Appl. No. 14/943,976, filed Nov. 17, 2015.
List of IBM Patents or Patent Applications Treated as Related.
Thomasian et al., "Performance Comparison of Mirrored Disk Scheduling Methods with a Shared Non-Volatile Cache," Distributed and Parallel Databases, vol. 18, No. 3, Nov. 2005, pp. 253-281.
Non-Final Office Action from U.S. Appl. No. 14/943,923, dated Feb. 9, 2017.
Non-Final Office Action from U.S. Appl. No. 14/943,954, dated Feb. 10, 2017.
Non-Final Office Action from U.S. Appl. No. 14/943,976, dated Feb. 27, 2017.
Non-Final Office Action from U.S. Appl. No. 14/943,872, dated Dec. 23, 2016.
Supplemental Notice of Allowance from U.S. Appl. No. 14/943,872, dated Aug. 18, 2017.
Final Office Action from U.S. Appl. No. 14/943,954, dated Aug. 28, 2017.
Final Office Action from U.S. Appl. No. 14/943,976, dated Sep. 7, 2017.
Notice of Allowance from U.S. Appl. No. 14/943,923, dated Aug. 28, 2017.
Notice of Allowance from U.S. Appl. No. 14/943,872, dated Jun. 30, 2017.
Notice of Allowance from U.S. Appl. No. 14/943,954, dated Dec. 26, 2017.
Notice of Allowance from U.S. Appl. No. 14/943,923, dated Jan. 9, 2018.

* cited by examiner

SPACE ALLOCATION IN A MULTI-GRAINED WRITEBACK CACHE

BACKGROUND

The present invention relates to space allocation in a data storage system, and more specifically, to space allocation in a multi-grained writeback cache of a data storage system.

Distributed storage systems require higher performance than currently possible in response to ever increasing workload density demands. Small random writes arise from a variety of virtual machine (VM) input/output (I/O) streams. Conventional caching systems that are designed to overcome the difficulties associated with small random writes suffer from their own set of problems. For systems that utilize client caches, it is difficult to maintain consistency across replicated writes. Additionally, systems that utilize server-side caches need to be able to scale a metadata memory footprint for addressing large cache and back-end address spaces that must be used in these systems to handle the increased workload density demands.

However, scaling the metadata memory footprint for large non-volatile memory (NVM) write caches is difficult to accomplish with conventional systems. A typical cache address space includes tens to hundreds of terabytes (TB) in storage space, and should support fine-grained updates for absorbing random writes and high NVM cache utilization. Moreover, back-end address space is typically in the order of petabytes (PB), and should be configured to support coarse-grained updates for destaging sequential and large blocks of data.

A system that utilizes application or client-side caching results in a cache that is read-mostly and improves I/O latency; however, small random writes require server-side caching that is configured to scale up to large cache address spaces and is not available with application or client-side caching. A system that utilizes clustered systems caches require consistency for writes across the cluster of machines using complex mechanisms, such as checkpointing, and is typically very difficult to scale.

SUMMARY

In one embodiment, a system includes a cache storage device and a processor and logic integrated with and/or executable by the processor. The logic is configured to receive a write request including data to be written to the cache storage device. The logic is also configured to determine a size of the write request. Moreover, the logic is configured to select a chunk size from among a plurality of chunk sizes designated for storing data in the cache storage device. In addition, the logic is configured to allocate a fine block descriptor (FBD) having the selected chunk size to the write request.

In another embodiment, a computer-implemented method includes receiving a write request including data to be written to a cache storage device. The method also includes determining a size of the write request. Moreover, the method includes selecting a chunk size from among a plurality of chunk sizes designated for storing data in the cache storage device. Additionally, the method includes allocating a FBD having the selected chunk size to the write request.

In yet another embodiment, a computer program product includes a computer readable storage medium having program instructions embodied therewith. The computer readable storage medium is not a transitory signal per se. Also, the embodied program instructions are readable/executable by a controller to receive, by the controller, a write request including data to be written to a cache storage device. Moreover, the embodied program instructions are readable/executable by the controller to determine, by the controller, a size of the write request. In addition, the embodied program instructions are readable/executable by the controller to select, by the controller, a chunk size from among a plurality of chunk sizes designated for storing data in the cache storage device. Also, the embodied program instructions are readable/executable by the controller to allocate, by the controller, a FBD having the selected chunk size to the write request.

Other aspects and embodiments of the present invention will become apparent from the following detailed description, which, when taken in conjunction with the drawings, illustrate by way of example the principles of the invention.

DETAILED DESCRIPTION

Figure 1:
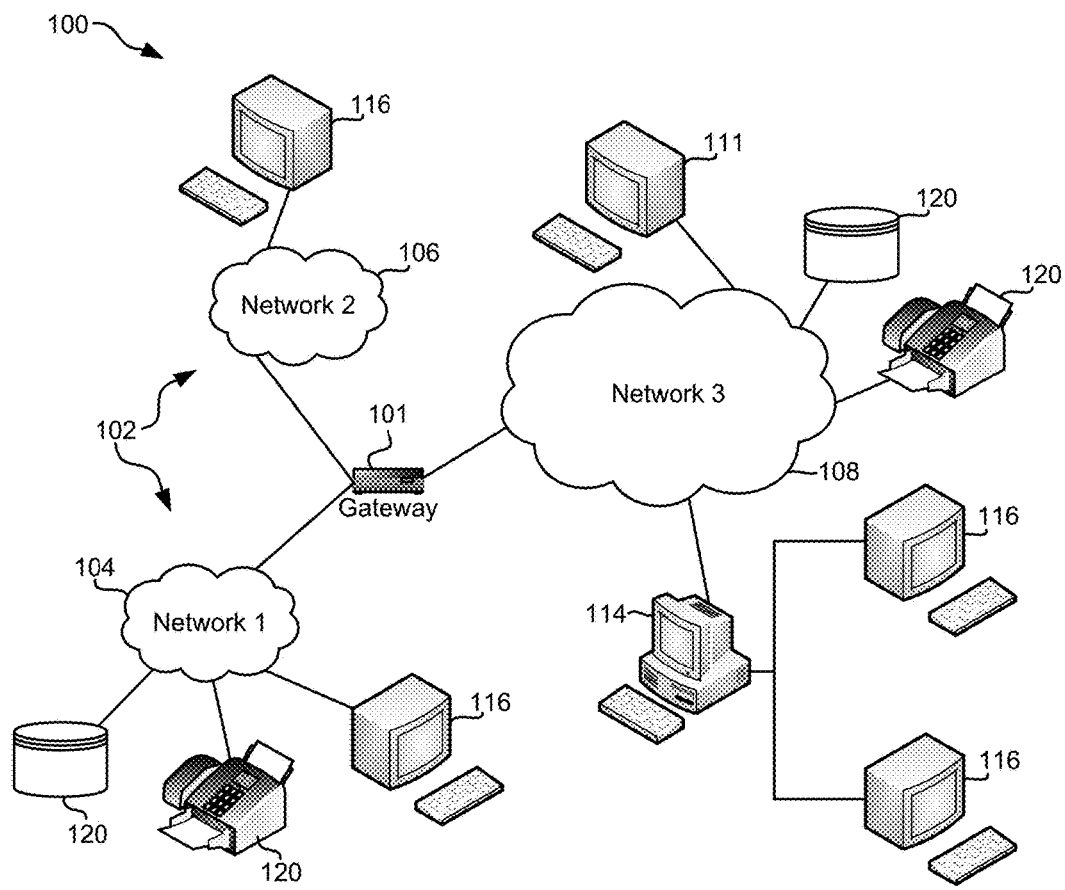
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of a scalable data storage system that utilizes a multi-grained metadata model for improved scalability and data consistency.

In one general embodiment, a system includes a cache storage device and a processor and logic integrated with and/or executable by the processor. The logic is configured to receive a write request including data to be written to the cache storage device. The logic is also configured to determine a size of the write request. Moreover, the logic is configured to select a chunk size from among a plurality of chunk sizes designated for storing data in the cache storage device. In addition, the logic is configured to allocate a fine block descriptor (FBD) having the selected chunk size to the write request.

In another general embodiment, a computer-implemented method includes receiving a write request including data to be written to a cache storage device. The method also includes determining a size of the write request. Moreover, the method includes selecting a chunk size from among a plurality of chunk sizes designated for storing data in the cache storage device. Additionally, the method includes allocating a FBD having the selected chunk size to the write request.

In yet another general embodiment, a computer program product includes a computer readable storage medium having program instructions embodied therewith. The computer readable storage medium is not a transitory signal per se. Also, the embodied program instructions are readable/executable by a controller to receive, by the controller, a write request including data to be written to a cache storage device. Moreover, the embodied program instructions are readable/executable by the controller to determine, by the controller, a size of the write request. In addition, the embodied program instructions are readable/executable by the controller to select, by the controller, a chunk size from among a plurality of chunk sizes designated for storing data in the cache storage device. Also, the embodied program instructions are readable/executable by the controller to allocate, by the controller, a FBD having the selected chunk size to the write request.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
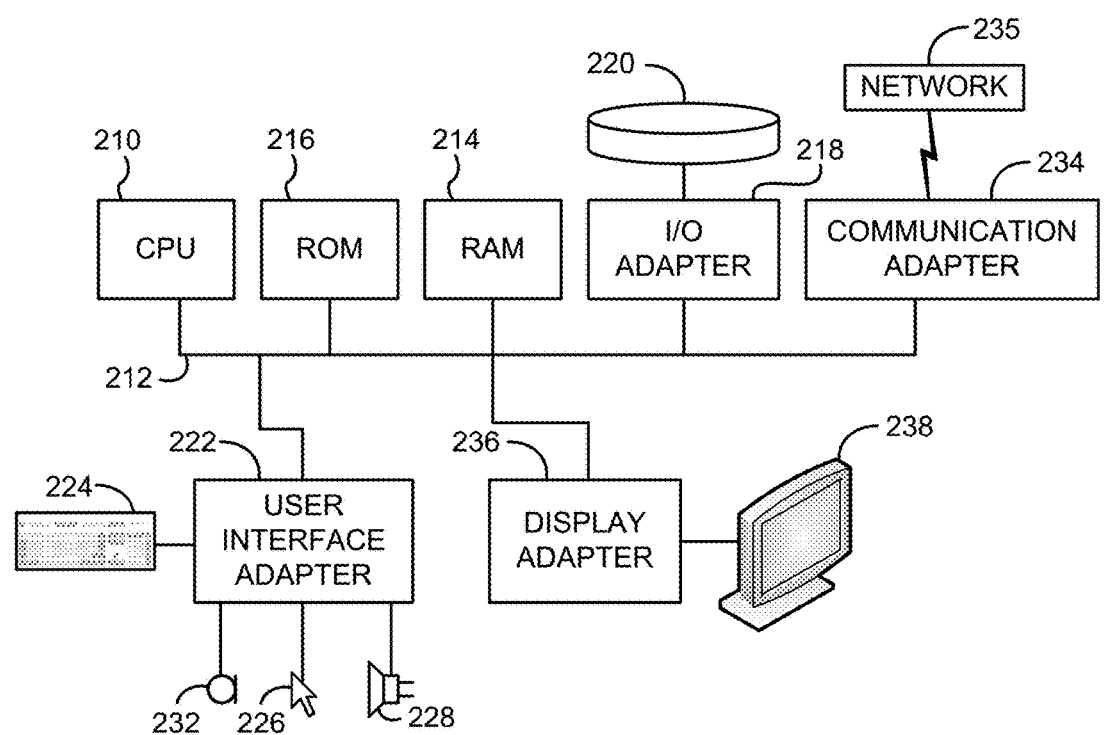
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
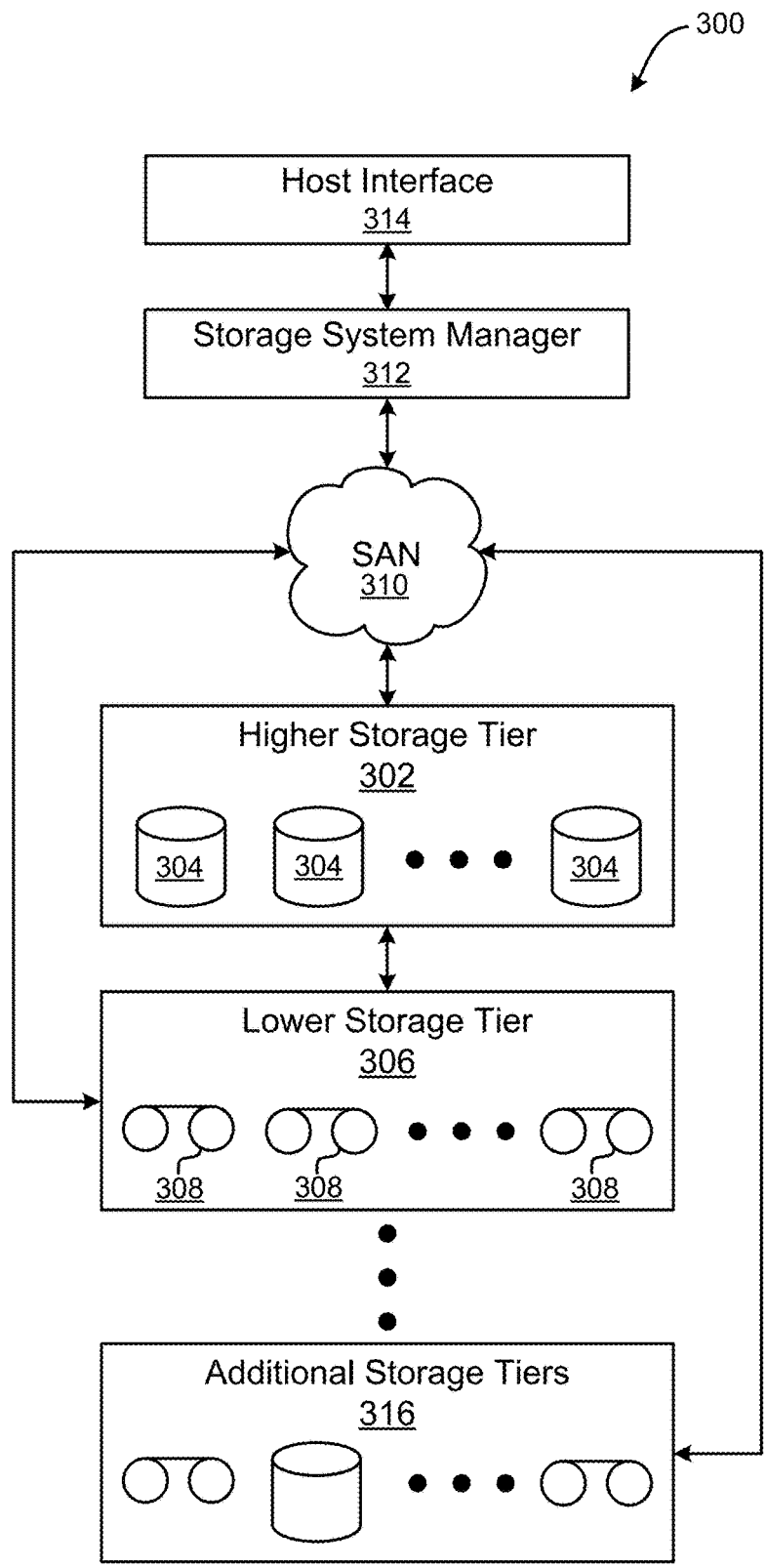
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), non-volatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system 300 may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

According to embodiments described herein, in order to maintain a low memory footprint for metadata in a data storage system while maintaining good performance of random writes, a data storage system utilizes a novel multi-grained metadata model with a cache management mechanism that minimizes the metadata memory footprint, maximizes fast, reliable non-volatile memory (NVM) utilization, and increases back-end disk performance.

The data storage system supports a cache storage device, having a storage capacity that is configured to scale up to the order of tens to hundreds of TB, for small, active data access requests, which may comprise any type of fast, reliable storage media known in the art, such as solid state NVM, e.g., Flash storage, SSD, random access memory (RAM), etc., and/or some other storage media known in the art. Moreover, the data storage system supports a back-end storage device configured to scale up to a storage capacity of one PB or more, which may comprise hard disk storage, tape drive storage, and/or some other persistent storage media known in the art.

The data storage system utilizes different request granularity, with a smaller request size, such as a 4 kB page up to several megabytes (MBs), for use with different filesystem block sizes, in one embodiment. This allows for high cache utilization for small writes and very low memory footprint. Also, a multi-grained metadata model for cache and back-end address space utilizes cache block descriptors (CBDs), which are coarse disk addressing mechanisms that provide for improved destaging performance and low memory footprint. Moreover, fine block descriptors (FBDs), which are fine-grained addressing mechanisms for cache, provide for small writes and variable-size allocation to achieve high cache utilization.

The data storage system is also configured to provide cache and metadata management which includes reading data by finding the location on the cache storage device or the back-end storage device by using metadata stored in CBD/FBD and a cache allocation bitmap. Moreover, data is written followed by an update to CBD in-memory and on cache while maintaining a correct order between concurrent I/O requests across the data storage system.

Figure 4:
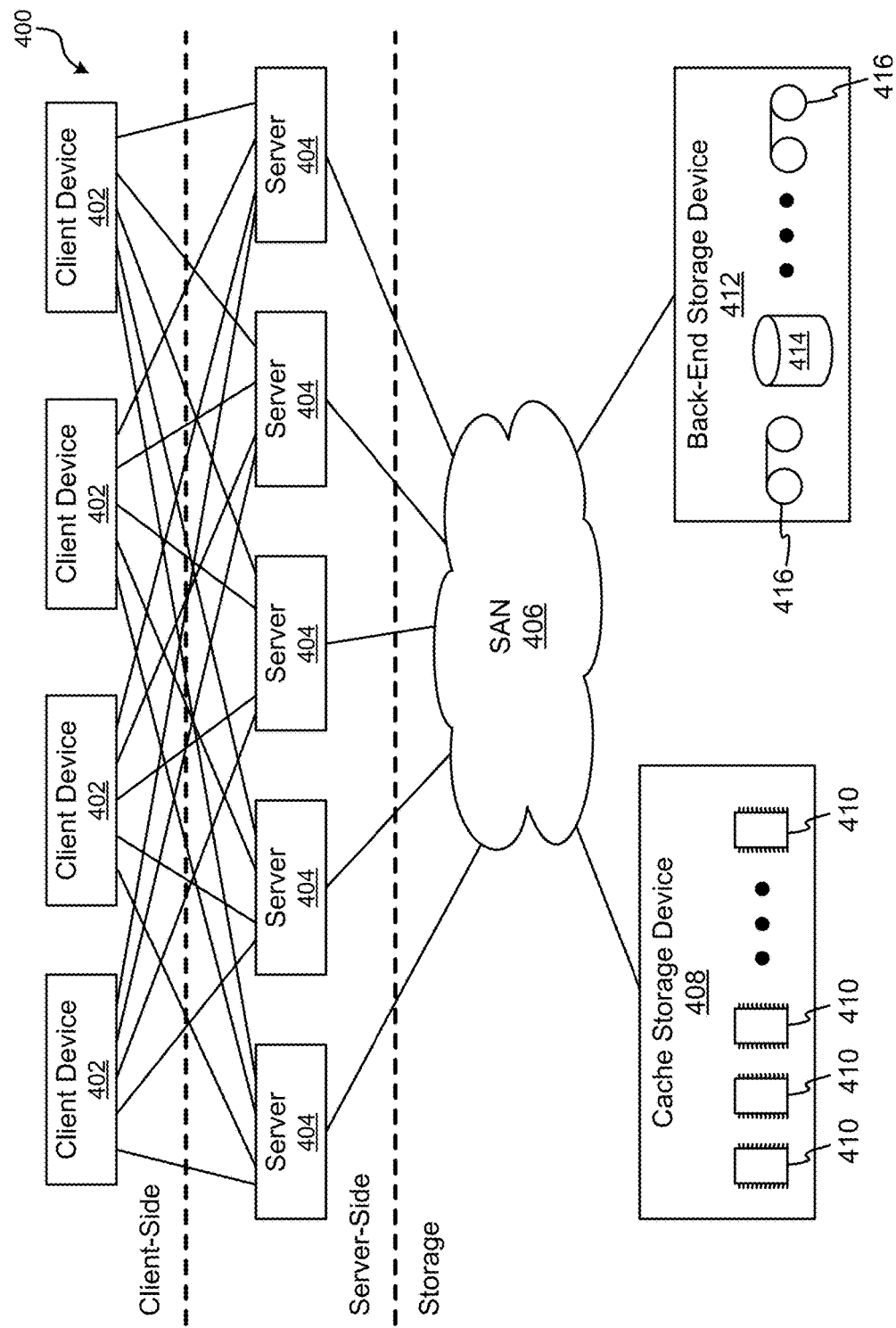
FIG. 4 depicts a data storage system, in accordance with one embodiment.

Now referring to FIG. 4, a data storage system 400 is shown that may be used in any of the embodiments described herein. The data storage system 400 includes interfaces for any number of client devices 402 on a client-side of the data storage system 400, each client device being connected to one or more servers 404 on a server-side of the data storage system 400. Each server 404 is configured for writing and reading data stored in the storage. The storage may include a storage area network (SAN) 406 that provides access to a cache storage device 408 and a back-end storage device 412, as shown in FIG. 4 according to one embodiment.

In an alternate embodiment, each server 404 is configured for writing and reading data stored in the cache storage device 408 and the back-end storage device 412 by directly accessing the various storage devices within the cache storage device 408 and the back-end storage device 412 or by accessing one or more controllers within the cache storage device 408 and the back-end storage device 412 for access to the various storage devices therein.

The cache storage device 408 includes a plurality of fast, reliable storage devices 410, such as NVM technologies, such as flash memory, flash memory array(s), RAM, ROM, SSDs, SSD array(s), etc. The overall size of the cache storage device 408 is not particularly limited, and may be in a range from tens of MBs of data storage capacity to hundreds of TBs of data storage capacity, and any value therebetween.

The back-end storage device 412 includes a plurality of storage devices, such as NVM (not shown), tape cartridges 416 operable in tape drives, HDDs 414, optical drives (not shown), etc. The overall size of the back-end storage device 412 is not particularly limited, and may be in a range from hundreds of TBs of data storage capacity to PBs of data storage capacity. The amount of each type of storage device in the back-end storage device 412 is only limited by implementation techniques and possible throughput limitations.

In another embodiment, one or both of the client-side and the server-side may have an operational cache (not shown) available for reading and writing data for temporary storage during any of various data management tasks. An operational cache may include any types of fast, reliable storage media, as described previously, or some other fast, stable storage type known in the art.

Figure 5:
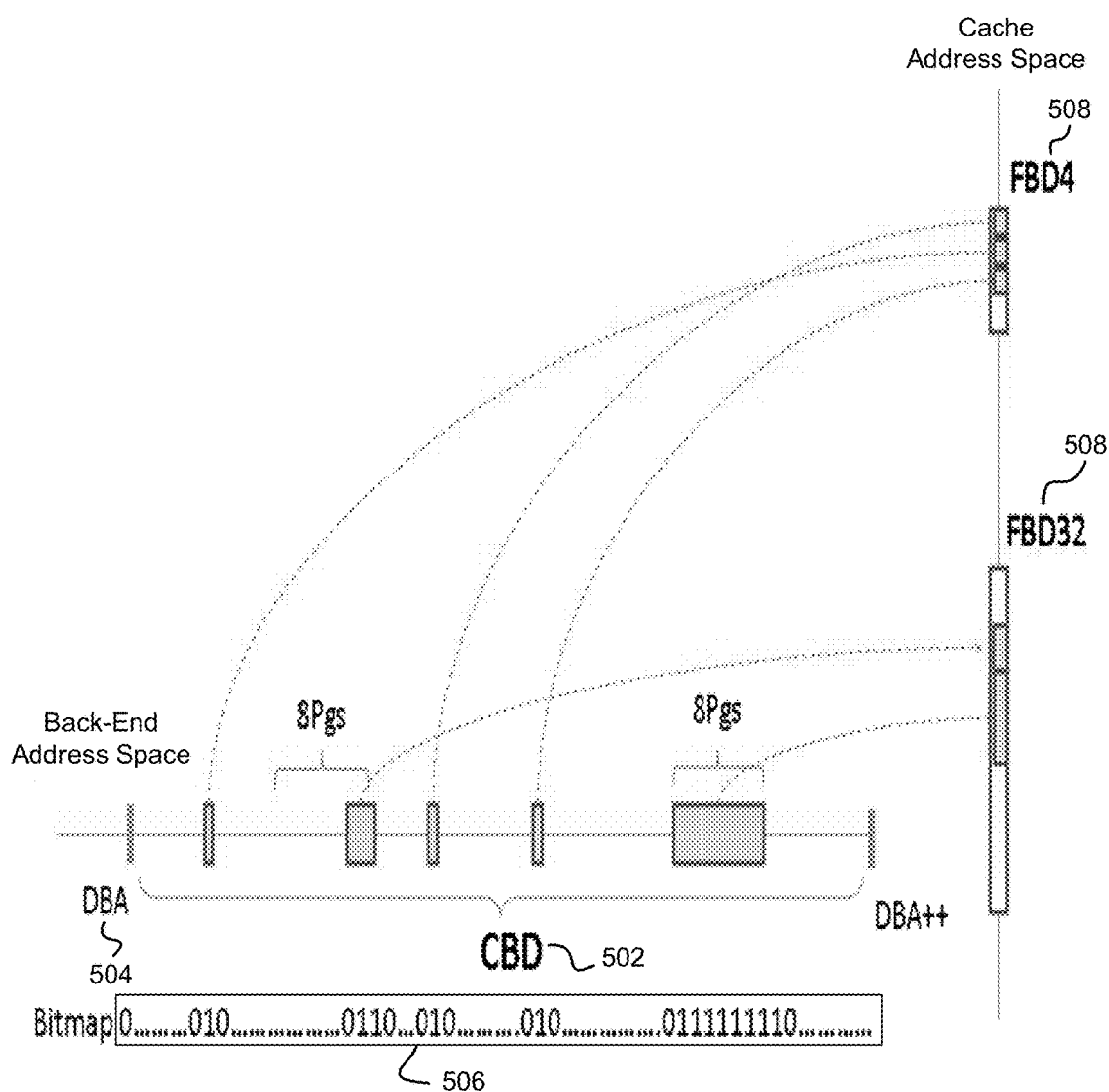
FIG. 5 shows a back-end address space and a cache address space relative to one another, according to one embodiment.

Now referring to FIG. 5, a back-end address space and a cache address space are shown relative to one another, with the back-end address space being represented by the x-axis and the cache address space being represented by the y-axis. The back-end address space may be on the order of about a PB or more. The back-end address space is configured to store data on a plurality of suitable data storage devices, logical, physical, or a combination thereof, and any data storage device known in the art may be used to make up the back-end address space. The collection of all data storage devices together in the back-end address space is referred to herein as the back-end storage device.

The back-end address space comprises a plurality of data blocks stored to one or more data storage media of the back-end storage device. Each data block is assigned a data block address (DBA), which is sometimes referred to as a disk block address when operating with HDDs, optical disk drives, etc. A single DBA 504 is shown in FIG. 5, but the back-end storage device includes many more DBAs representing storage locations for the plurality of data blocks therein.

Metadata is produced and stored for each DBA, such as DBA 504, in a corresponding CBD, such as CBD 502 shown in FIG. 5. Although FIG. 5 shows a one-to-one relationship between the DBA and CBD 502, this is not a requirement, and a CBD may represent less than one DBA or more than one DBA, in various approaches.

The metadata may comprise any relevant information about the corresponding DBA, such as heat information relating to the data stored in the corresponding data block (how often the data is accessed, most recent access, etc.), validity information (information about whether the data stored to the back-end storage device is the most recent and up-to-date data, which is effected when the data is updated or overwritten in the cache storage device but not yet propagated to the back-end storage device), density of data stored to the data block (a measure of the efficiency of the memory usage), and other associated metrics, that are readily known in the art, for the data stored to the data block associated with the CBD.

The CBD 502 is a coarse-grained unit for destaging data, since data is most efficiently written to the back-end storage device sequentially in large chunks. The CBD 502 also supports sparse allocation in the cache storage device, as data for one CBD 502 may be scattered in various logical locations within the cache address space represented by a plurality of FBDs 508, which provides for a low memory footprint.

In addition, cache allocation bitmaps 506 for each page within the DBA 504 are maintained in the CBD 502. The cache allocation bitmaps 506 indicate a cache status for the corresponding page, according to one embodiment. Each cache allocation bitmap 506 includes a plurality of bits. The bits may be set to a value of zero or one, with zero indicating that the data in the page is not stored in the cache storage device, and a one '1' indicating that the data in the page is stored in the cache storage device, according to one embodiment. In an alternate embodiment, zero indicates that the data in the page is stored in the cache storage device, and a one '1' indicates that the data in the page is not stored in the cache storage device.

CBD 502 may be used, in one embodiment, for determining locations of data stored in the back-end storage device with a course granularity that is greater than a granularity used by the FBDs 508 for determining locations of data stored in the cache storage device, e.g., each CBD 502 is at least as large in size as any of the FBDs 508, and preferably larger in size.

FIG. 5 shows an example of a single CBD 502 from the back-end address space, which includes a plurality of pages of information which map to data stored in the back-end storage device. The size of each individual CBD 502 may be selected as desired by an administrator to most efficiently represent the size of the back-end storage device, and is only restricted to the following relationship: CBD≥FBD, and preferably CBD>>FBD. It is this coarse granularity provided by the CBD 502 and the fine granularity provided by the FBDs 508 which enables the fast access times for data locating in the back-end storage device and the cache storage device, respectively, while maintaining a low memory footprint.

In various embodiments, each CBD 502 may have a size in a range from about 10 kB to about 10 MB, and may map to data having a size in a range from about 2.5 MB to about 2.5 GB. In a data storage system, each CBD 502 may have the same size or may have a variety of sizes configured to adapt to storage needs in the back-end storage device, although a consistent size is preferred. According to one embodiment, each CBD 502 may be about 1 MB in size, and may map to data having a size of about 250 MB in the back-end address space.

Furthermore, in one embodiment, the FBDs 508 may each be sized individually, to allow for adaptability to storage demands of data to the cache storage device. The FBDs 508 provide a mechanism for reverse lookup as compared to the CBDs 502, e.g., from the cache address space to the back-end address space, via an offset in the DBA 504 discoverable from the CBD 502. The FBDs 508 are fine-grained to absorb small random writes scattered across the cache address space.

In various embodiments, each FBD 508 may have a variable and selectable size, with a minimum size being equal to the size of a disk sector, and a largest size being equal to a size of one CBD 502. However, it is preferable that all FBDs 508 are smaller in size than any of the CBDs 502. FIG. 5 shows two sizes of FBDs, a 4 kB size (FBD4) and a 32 kB size (FBD32); however, any conceivable size may be used, and are not limited by the descriptions herein.

According to one embodiment, a FBD 508 may have a size in a range from about 125 bytes to about 1 MB, and may map to data having a size in a range from about 32 kB to about 250 MB. According to one embodiment, each FBD 508 may be about 4 kB in size, and may map to data having a size of about 1 MB in the cache address space for balancing high cache utilization and low memory footprint.

In accordance with one embodiment, a predetermined distribution of FBD sizes may be provided in the cache address space, with a predetermined number of each of a plurality of FBD sizes. For example, and in no way limiting, there may be a total of 3000 FBDs representing all storage in the cache address space having the following numbers and sizes: 1000 4 kB, 800 8 kB, 600 16 kB, 300 32 kB, 150 64 kB, and 150 128 kB. This distribution of FBDs may be used with CBDs having a size of 256 kB or more, in a further approach.

According to another embodiment, FBD sizes in the cache address space may be dynamically determined, according to the sizes of the write requests received to store data to the cache address space. The cache address space may still be split into a plurality of different FBD sizes, but there is no predetermined distribution of these FBDs. In this embodiment, there may be predetermined FBD sizes to be created, with no limit on the number of each FBD size, nor is the cache address space spilt into the plurality of FBDs prior to receiving the data to store. A FBD is created that is large enough to fit the data, without being larger than necessary based on the sizes of FBDs that are available to be created.

For example, and in no way limiting, if a write request is received that has a size of 62 kB, then a FBD of size 64 kB may be created to store this information when FBD of sizes 32 kB, 64 kB, and 128 kB are available to be created. In another example, if a write request is received that has a size of 5 kB, then a FBD of size 8 kB may be created to store this information when FBD of sizes 4 kB, 8 kB, and 16 kB are available to be created.

In one approach, the FBD sizes may not be limited to a predetermined set of sizes, and in this approach, a new FBD may be created that is sized appropriately to fit the data to be written to the cache address space. For example, if a write request is received that has a size of 45 kB, then a FBD of size 45 kB may be created to store this information and the data storage system remembers the size of this particular FBD.

As shown in FIG. 5, the cache allocation bitmap 506 provides indication of whether a particular page or page(s) in a DBA 504 are stored in the cache storage device. Furthermore, it is noted that the arrangement of the data in the back-end storage device is not determinative as to how the data is stored in the cache storage device, and therefore, the FBDs 508 are useful in locating the data in the cache storage device, and are related to the CBDs relating to the same data.

The cache allocation bitmap 506 may be used to determine whether data stored to the back-end storage device is the most recent information, and has not been updated, replaced, changed, or deleted in the cache storage device. This is accomplished by determining the validity of the data in the cache allocation bitmap 506 prior to relying on data retrieved from the back-end storage device.

During a read operation, initiated in response to receiving a read request for data stored in the data storage system, the DBA 504 relating to the requested data is calculated. Then, the particular CBD 502 for the DBA 504 is determined, and the cache allocation bitmap 506 is used to determine whether the requested data is stored in the cache storage device or only in the back-end storage device. Furthermore, the cache allocation bitmap 506 may be used to check the validity of an offset within the DBA 504. When the data is stored in the cache storage device, an offset is provided to locate the FBD 508 which stored metadata for the requested data. Next, the FBD 508 associated with the offset is determined, and the data is read from the cache storage device, according to a page address determined from the associated FBD 508, and output to the requester. Reads with concurrent writes to overlapping FBDs 508 are serialized during this operation, in one embodiment.

In response to a determination that the data is not stored in the cache storage device, by consulting the cache allocation bitmap 506, the data is retrieved from the back-end storage device according to the metadata stored in the associated CBD 502 and output to the requester.

Figure 6:
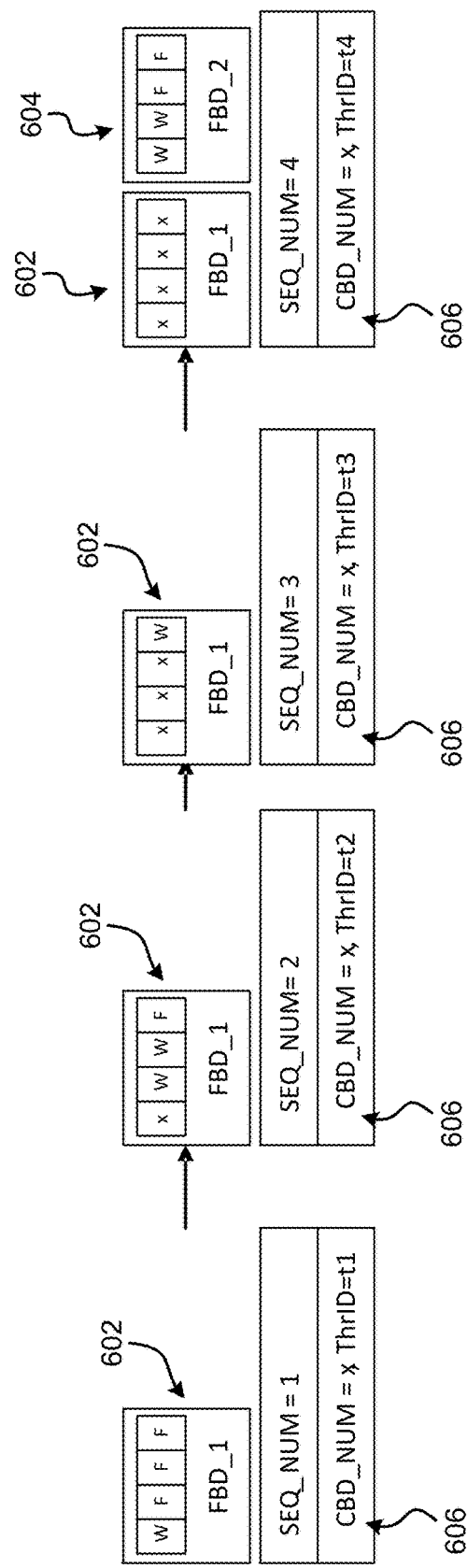
FIG. 6 shows a write operation to a cache storage device according to one embodiment.

Now referring to FIG. 6, a write operation is described according to one embodiment. In a write operation, in response to receiving a request to perform a write operation, the DBA that stores corresponding data is calculated based on the requested data to write in the write request. Then, a corresponding CBD 606 of the DBA for the corresponding data is determined so that the corresponding data may be overwritten, updated, replaced, or accessed. Next, the cache allocation bitmap is used to determine validity of an offset within the DBA that relates to a storage location of the corresponding data. Then, a corresponding FBD 602 is selected using the offset, and a page address within the cache storage device is determined, the page address being represented by the selected FBD 602.

In the FBD 602 shown in FIG. 6, there are four pages within the FBD 602, indicated as the four rectangles therein. Each page includes an indication of its current state, with F indicating that the page is free (empty or including erased data), W indicating a page currently being written to, and x indicating a page that is storing data currently.

Once the page address within the cache storage device is determined, an uncommitted CBD 606 is updated in-memory and a sequence number is assigned to the uncommitted CBD 606, indicated as "1" in the first exemplary FBD 602. The data is written to the cache storage device according to the page address, with concurrent writes to the same CBD 606, indicated as CBD x, being queued in-memory and assigned new sequence numbers. Also, uncommitted CBDs for which data writes have finished are committed to the cache storage device in the order of their sequence numbers, and may be batched after merging CBDs in-memory in one embodiment, to simplify this operation. As shown, when there is insufficient space available in a current FBD 602, a second FBD 604 is selected and used to store additional data for the write request.

In the exemplary flow shown in FIG. 6, data is written to the first page of the FBD 602, and the sequence number for the CBD 606 is set to "1." Then, data is written to the next two pages of the FBD 602, and the sequence number for the CBD 606 is set to "2." In response to data being written to the last page of the FBD 602, the sequence number for the CBD 606 is set to "3." When additional data is received to be written, a second FBD 604 is obtained and the data is written to the pages of this FBD 604. Also, the sequence number for the CBD 606 is incremented, this time to "4."

Of course, each FBD may have more or less pages than those shown in FIG. 6. Moreover, the size of the pages of each FBD may be variable or the same, in several approaches.

Figure 7:
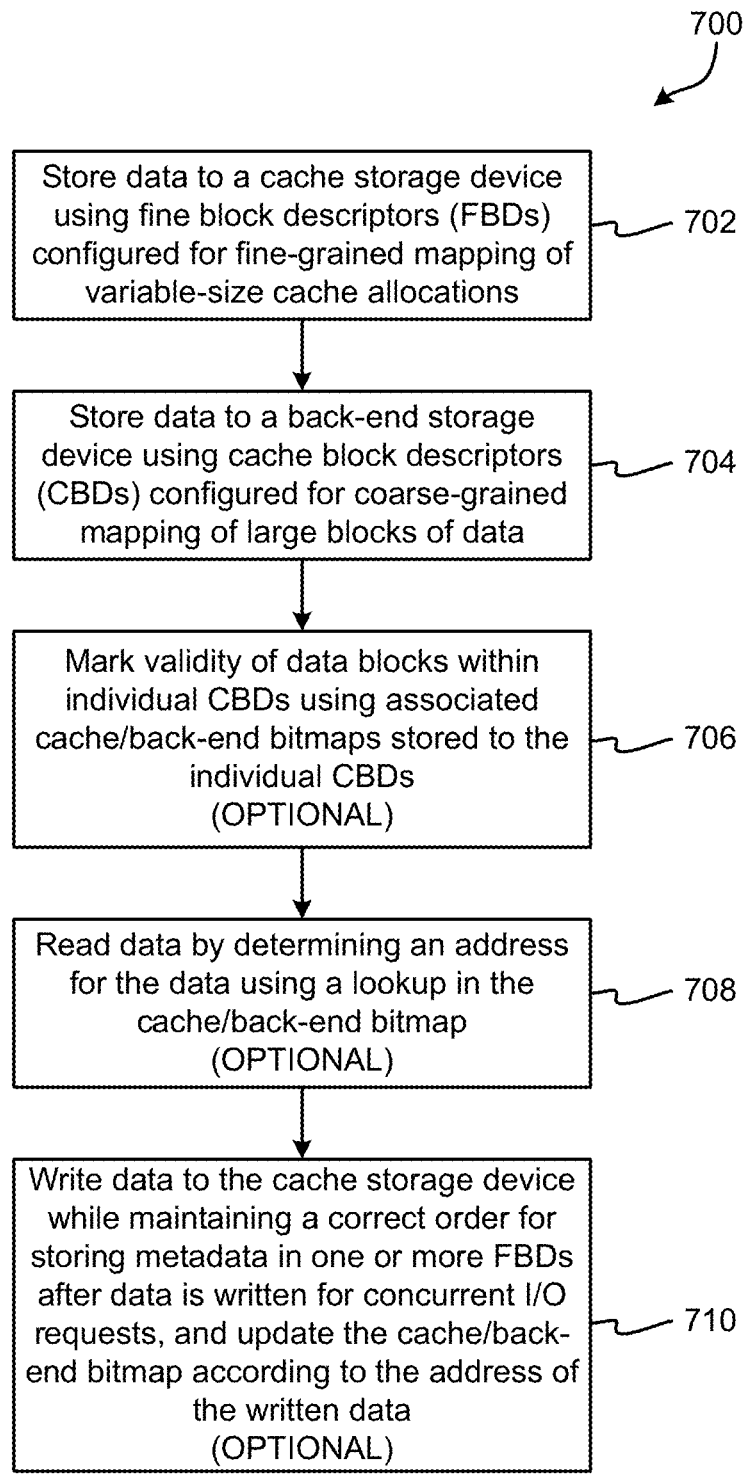
FIG. 7 is a flowchart of a method, according to one embodiment.

Now referring to FIG. 7, a flowchart of a computer-implemented method 700 for reading data stored to a data storage system is shown according to one embodiment. The method 700 may be performed in accordance with the present invention in any of the environments depicted herein, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a controller, a processor, a data storage system, a server, and/or some other processing unit described herein, alone or in combination with other software and/or hardware, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where data is stored to a cache storage device using FBDs to store metadata about the data stored to the cache storage device, such as usage, address, etc. The FBDs, as described herein, are configured for fine-grained mapping of variable-size cache allocations. The data and creation/use of the FBDs may be performed by a server of a data storage system, in one embodiment.

The cache storage device may comprise any fast, reliable storage devices known in the art, such as RAM, flash, SSDs, etc.

In operation 704, data is stored to a back-end storage device using CBDs to store metadata about the data stored to the back-end storage device, such as usage, address, etc. The CBDs, as described herein, are configured for coarse-grained mapping of large blocks of data.

The back-end storage device may comprise any long-term storage devices known in the art, such as tape-based media, HDDs, optical disks, etc.

At least some, and preferably all, FBDs are smaller in size than any of the CBDs. In a further approach, all CBDs may be of the same size. Also, all FBDs are equal to or smaller in size than any of the CBDs. Moreover, the size of any FBD may be very much less than a size of any of the CBDs, by an order of ten or more, e.g., 16 kB FBD as compared to 1 MB CBD.

In optional operation 706, validity of data blocks within individual CBDs are marked using associated cache allocation bitmaps stored to the individual CBDs. Each CBD has its own cache allocation bitmap that includes a cache status (whether the page is stored to the cache storage device or not) for corresponding pages in the CBD, according to one embodiment. Validity is an indication of the current state of the data as stored to the back-end storage device, in case updated data has been written to the cache storage device.

In optional operation 708, data is read from either the cache storage device or the back-end storage device by determining an address for the data using a lookup in the cache allocation bitmap. In this way, it may be determined whether the data is available in the cache storage device, which would allow for it to be retrieved more quickly than if it is stored in the back-end storage device.

In optional operation 710, data is written to the cache storage device while maintaining a correct order for storing metadata in one or more FBDs after data is written for concurrent I/O requests, and the cache allocation bitmap is updated according to the address of the written data to reflect that the data is now written to the cache storage device.

In one embodiment, more than one size of FBD is used to map data to the cache storage device, such as 4 kB, 8 kB, 16 kB, 32 kB, 64 kB, 128 kB, . . . , and 1 MB.

In a further embodiment, a predetermined distribution of different sizes of FBDs are available for storing data in the cache storage device. In this embodiment, the cache storage device is split into the plurality of FBDs prior to storing data therein, such that an available FBD is used to store data, making the FBD unavailable. When this data is removed from the cache storage device, the FBD again becomes available for use to store other data to the cache storage device.

In an alternate embodiment, different sized FBDs may be dynamically created in response to a size of data to be stored in the cache storage device. In this embodiment, the requested write size dictates the size of the FBD to be created, such that a minimum amount of space in the cache storage device is wasted.

The multi-grained mapping of variable size cache allocations, combined with the coarse-grained mapping of the back-end storage is useful in many different applications, including cloud-based computing, data and storage virtualization, "Big Data" storage systems, etc. The elastic and readily scalable solutions described herein in various embodiments improve server-side write caches for small updates with low memory footprints.

A data storage system that utilizes a cache storage device with fixed-size FBDs is able to allocate space based on a simple first fit or best fit approach. However, a data storage system that uses a multi-grained cache, according to embodiments described herein, may rely on a mechanism configured to determine an amount of space to allocate for a given write request based on an amount of data to be stored.

The choice of the amount of space to allocate to the given write request (an allocated chunk size) impacts the amount of available space for the given write request and the granularity at which metadata is available for the allocated portion of the cache address space. This is to say that the allocated chunk size corresponds proportionally to the size of the metadata (the size of the FBD) used when storing the data to the cache storage device.

The allocation of larger sized chunks results, typically, in space wastage (in response to no further write requests to the CBD being received) in comparison to using smaller sized chunks with corresponding smaller sized FBDs. The advantage of coarse-grained metadata for a larger space is wasted when the chunk sizes approach the size of the CBDs.

Figure 8:
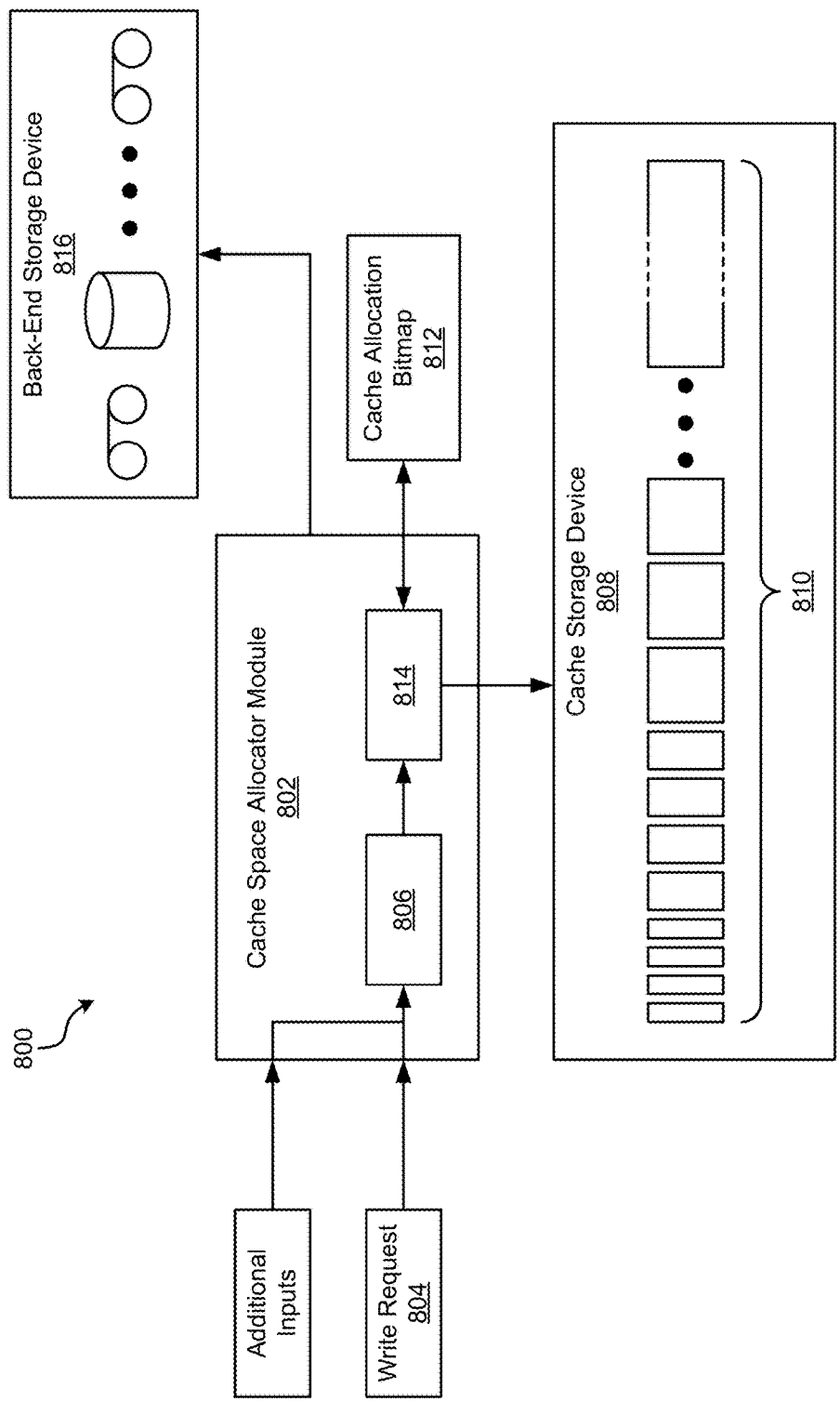
FIG. 8 shows a system having a cache space allocator module according to one embodiment.

Now referring to FIG. 8, a system 800 is shown that comprises a cache space allocator module 802 configured to determine an amount of space to allocate for a given write request 804 based on an amount of data to be stored (according to a requested size of the data to be stored in the write request 804).

The cache space allocator module 802 includes a first component 806 configured to determine a size of space to allocate (an allocated chunk size) to the write request 804. This determination is based on one or more inputs to the system 800 and a state of the cache storage device 808 to which the data in the write request 804 is to be stored. The state may include busy or free, an amount of free space in the cache storage device 808, a number and size of preconfigured FBDs 810 within the cache address space available for allocation to new data, etc. The one or more inputs include information about the present write request 804, information about one or more additional write requests also pending on the cache address space that effect which cache block to select for the write request 804, information about one or more pending actions on the cache address space that may affect the space available in the cache storage device, etc.

Moreover, the cache space allocator module 802 includes a second component 814 configured to select a cache block (selected cache block) from the cache storage device in the cache address space that has a size that corresponds to the allocated chunk size. By "corresponds to the allocated chunk size," what is meant is that the selected cache block is at least as large as the amount of data to be stored as indicated by the write request 804.

In one embodiment, the cache space allocator module 802 may use the cache allocation bitmap 812 to determine which cache blocks are allocated for the write request 804. Furthermore, the cache allocator module 802 may rely on information in addition to information included in the cache allocation bitmap 812 to determine which cache blocks are allocated for the write request 804, such as other pending write requests, a cache residence period for data stored to the cache storage device, a subrange size for data in the write request 804, available FBD chunk sizes (for the corresponding CBD), actual chunk size utilization within allocated FBDs by the corresponding CBD, etc.

According to one embodiment, the cache space allocator module 802 does not visibility to the validity of data stored to the cache storage device 808, nor does the cache space allocator module 802 need such information to perform its functionality.

In addition to being configured to respond to write requests 804, the cache space allocator module 802 is configured to perform cache block allocation for operations in the I/O path and in response to requests from a defragmentation module, which are described in more detail later.

Specifically, the cache space allocator module 802 is configured to determine a cache chunk size to assign to data in response to a request for allocation of cache space in one embodiment. The cache space allocator module 802 is also configured to provide an address for the allocated chunk size ("cache address") so that the data may be written to the cache at the designated cache address. Moreover, in one embodiment, the cache space allocator module 802 is configured to update the cache allocation bitmap 812 in response to allocating the cache chunk to the request.

One implementation of the cache space allocator module 802 may have statically allocated ranges for each supported cache chunk size. In another implementation, the cache space allocator module 802 may be configured to create a cache chunk dynamically in response to a request for space allocation.

In one embodiment, a data storage system may include, in at least one portion, about 64 million CBDs, with each CBD having a size of about 500 kB, resulting in about 32 TB of cache capacity. Moreover, when there are 16 FBDs having an average chunk size of about 4 kB for each CBD, the cache capacity of 32 TB is available for absorbing 4 4B writes, with 128 pages per CBD.

In another implementation, the cache space allocator module 802 may size the FBDs within certain ranges dynamically in response to write requests. Every CBD may have a fixed number of FBDs with different chunk sizes, or may dynamically create the FBDs on an as-needed basis.

In response to a write request being for a subset of allocated and/or assigned chunks, no new allocation is created. Instead, the data is written to the existing FBD for in-place overwrite.

In response to a write request indicating new data to be stored, even in a case where some existing data is being modified, replaced, and/or deleted, a new FBD allocation is created because at least a part of the request range does not fit within the existing allocated FBDs. In this case, a new allocation is requested from the cache space allocator module 802 for an unallocated subrange, which is allocated to fulfill the write request.

The cache space allocator module 802 is configured to determine a chunk size to allocate for any given write request. This determination may be based on any relevant factors, such as a size of the subrange being written, available FBD chunk sizes (for the corresponding CBD where the data is being written, actual chunk size utilization within allocated FBDs of the corresponding CBD, and other factors known in the art.

In response to an allocation attempt failing, the write request is sent to a controller in charge of the back-end storage device 816, and any data corresponding to the write request is invalidated in the cache, which is reflected in the cache allocation bitmap 812.

Figure 9:
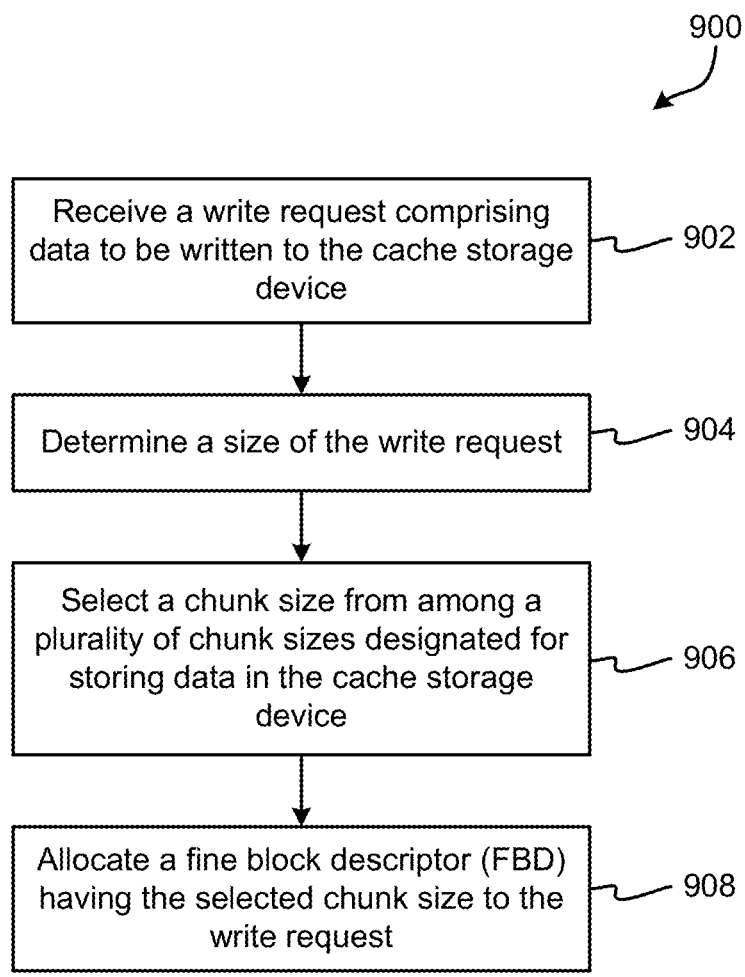
FIG. 9 is a flowchart of a method, according to one embodiment.

Now referring to FIG. 9, a flowchart of a computer-implemented method 900 for reading data stored to a data storage system is shown according to one embodiment. The method 900 may be performed in accordance with the present invention in any of the environments depicted herein, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a controller, a processor, a data storage system, a server, and/or some other processing unit described herein, alone or in combination with other software and/or hardware, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a CPU, an ASIC, a FPGA, etc., combinations thereof, or any other suitable computing device known in the art.

As shown in FIG. 9, method 900 may initiate with operation 902, where a write request comprising data to be written to a cache storage device is received. The write request may be received by a cache space allocator module, according to one embodiment, or any other processor or controller configured to allocate space in a cache storage device.

In operation 904, a size of the write request is determined. The size is related to an amount of space that will be taken up when the data of the write request is stored to the cache storage device.

In operation 906, a chunk size from among a plurality of chunk sizes designated for storing data in the cache storage device is selected. This chunk size corresponds to the size of the write request, in one embodiment.

Moreover, in one approach, a chunk size is selected that is large enough to store the data of the write request and no greater in size than a next larger chunk size of the plurality of chunk sizes available for storing data in the cache storage device.

In one embodiment, a static pool of FBDs may be available for storing data to the cache storage device for each CBD, with the chunk sizes of each FBD being predetermined.

In an alternate embodiment, FBDs of variable chunk size may be dynamically created in response to receiving a write request, with the FBD created having a size corresponding to the size of the write request.

Additionally, in some approaches, a number of FBDs and/or a total size of all FBDs allocated to a single CBD may be limited, in order to keep control on the metadata footprint of each CBD and provide each cached CBD with a fair share (even if the share is not equal with other CBDs) of chunk sizes to choose from and to utilize to store data.

In operation 908, a FBD having the selected chunk size is allocated to the write request. By allocating what is meant is that this space on the cache storage device is set aside for the data of the write request and will no longer be available for allocation to another write request. Upon the data stored to the selected FBD being deleted or moved, the FBD will again become available for allocation.

In response to a determination that no FBDs having the selected chunk size are available in the cache storage device, three options are possible: 1) the FBD having the selected chunk size is dynamically created assuming that the cache storage device has sufficient space for an additional FBD of the selected size, 2) a FBD having a larger size is selected when dynamic creation is not possible, or 3) no FBD is created, and the write request is sent to a second controller configured to manage a back-end storage device in response to failing to create the FBD having the selected chunk size. In this way, even if the cache storage device is full or unavailable, or a FBD of the selected size is not available for any reason, the write request is not failed; instead, it is sent to store the data on the back-end storage device, which typically is a slower process, but also ensures no data is lost in the process.

According to one embodiment, existing data stored to the cache storage device that includes any portion of the data of the write request is invalidated upon receiving the write request. This invalidation is performed to ensure that data integrity is maintained in the face of multiple instances of the same data. Should the data be copied from the back-end storage device to the cache storage device, then the cache allocation bitmap will be modified to reflect this condition.

Moreover, method 900 includes, in some approaches, updating the cache allocation bitmap to indicate invalidation of the existing data stored to the cache storage device in response to a determination that any portion of the data of the write request exists in the cache storage device. This also is performed to ensure data integrity.

According to another embodiment, method 900 may include writing the data to the FBD in the cache storage device, storing metadata about the written data in the FBD (as described previously), and updating the cache allocation bitmap according to an address of the written data.

In another embodiment, method 900 may consider an amount of space in the cache storage device currently allocated for a CBD corresponding to the write request and a utilization of the space in the cache storage device in selecting the chunk size. The utilization may be useful in determining how efficient this CBD uses the space in the cache storage device. The amount of space allocated in the cache storage device for a particular CBD is useful when limiting the amount of space for the CBD, such that new write requests to the cache storage device will be deferred to the back-end storage device when the space limitation is reached for the particular CBD, in one embodiment.

In conventional data storage systems that utilize cache storage typically rely on serialized operations with which to process write and read requests on the cache storage. While serialized operations are simpler to implement, the use of serialized operations reduces performance of the data storage system. Accordingly, it is beneficial to support concurrent, non-overlapping read and/or write operations in order to obtain higher performance than is possible using serialized operations. Furthermore, in conventional data storage systems, request starvation where read and/or write requests are stalled due to insufficient resources being available to fulfill the request, is a problem that affects attempts to perform dependent, concurrent operations. However, with embodiments described herein, latency spikes caused by request starvation may be reduced when compared to conventional data storage systems.

According to one embodiment, a data storage system that utilizes a caching framework may include a mechanism configured to support multiple independent concurrent operations while providing bounded waiting times for all access requests. Such a system has advantages over conventional data storage systems, such as improved performance over a serialized, coarse-grained framework, bounded wait times allow all requests to progress without request starvation occurring, more deterministic latency for a fixed maximum queue length that is useful for a faster acting cache storage device, etc.

Figure 10:
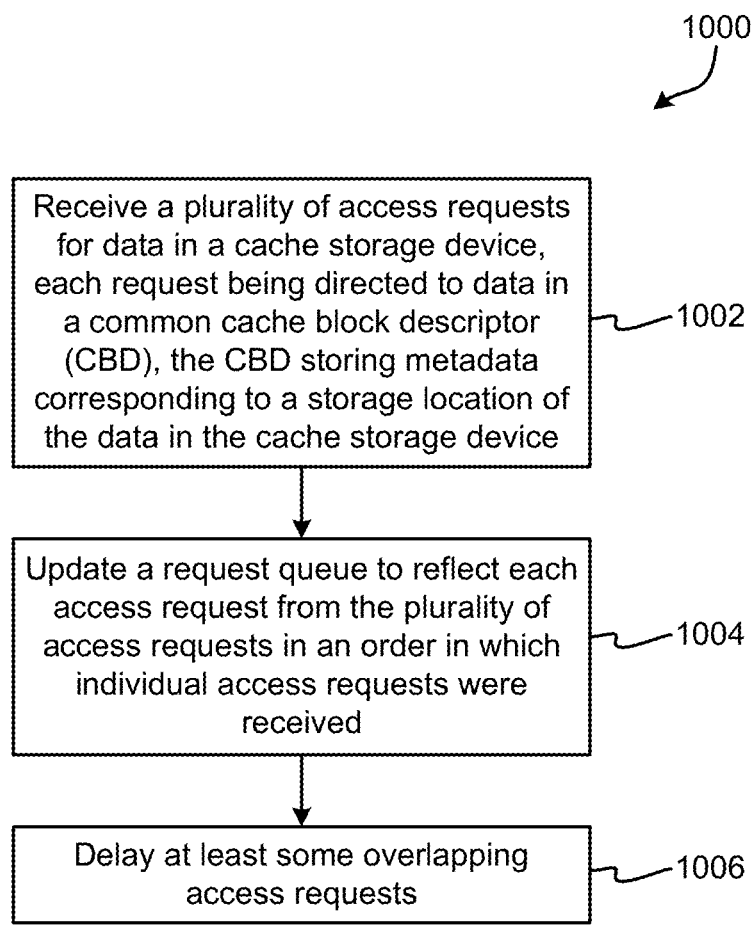
FIG. 10 is a flowchart of a method, according to one embodiment.

Now referring to FIG. 10, a flowchart of a computer-implemented method 1000 for concurrent I/O operation in a caching framework is shown according to one embodiment. The method 1000 may be performed in accordance with the present invention in any of the environments depicted herein, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a processor, a data storage system, a server, and/or some other processing unit described herein, alone or in combination with other software and/or hardware, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a CPU, an ASIC, a FPGA, etc., combinations thereof, or any other suitable computing device known in the art.

As shown in FIG. 10, method 1000 may initiate with operation 1002, where a plurality of access requests (which may include read requests, destage requests, and/or write requests) for data in a cache storage device are received. The plurality of access requests may be received by a committer module, according to one embodiment, or any other processor or controller configured to manage access requests for a cache storage device. Each request is directed to data (previously stored according to a read request, to be store according to a write request, etc.) in a common CBD. The CBD, as described in more detail herein, stores metadata corresponding to a storage location of the data in the cache storage device.

In operation 1004, a request queue is maintained, which includes updating the request queue (and may also be created in the case where the request queue does not already exist) for the common CBD in the data storage system, the request queue comprising each access request directed to the common CBD along with a committed or uncommitted status associated with the request. The request queue is updated to reflect each access request from the plurality of access requests in an order in which individual access requests were received.

The committed status indicates that an access request for a particular CBD has been resolved and the metadata in the CBD has been updated to reflect any changes brought about by the access request.

The uncommitted status indicates that an access request for the particular CBD has not been resolved and/or that metadata in the CBD has not been updated according to the access request. Resolving an access request may comprise completing the I/O request and updating the metadata accordingly, cancelling the I/O request, putting the particular CBD into a safe state where other access requests may proceed, etc. In essence, resolving the access request frees the corresponding CBD for other I/O so further access requests may proceed.

This request queue may be referred to as a chain of committed and uncommitted CBD. A separate request queue is maintained for each CBD that is in-memory. By in-memory, what is meant is that any portion of data for the CBD is stored in the cache storage device. When data of the CBD is not stored in the cache storage device, then a request queue may be created in the event that an access request is received for data in the CBD. In response to such a request, data may be copied from the back-end storage device and placed in the cache storage device, with a corresponding indication in the chain of committed and uncommitted CBD, or new data may be written in the cache storage device for a particular CBD, with a corresponding indication in the chain of committed and uncommitted CBD.

In case access requests are received for data associated with a different CBD (a second CBD) from the common CBD referenced previously, a second request queue is created in response to receiving these access requests directed to the second CBD.

In operation 1006, at least some overlapping access requests are delayed. Some access requests may overlap in the cache storage device, since the size of each CBD used to describe data stored to the back-end storage device is larger, in one embodiment, than the size of any of the FBDs used to describe data stored to the cache storage device. Therefore, multiple access requests may target data in the same FBDs, while some access requests may target data in other, different FBDs. When the access requests target data in different FBDs, they are non-overlapping, while access requests that target data in the same FBDs are overlapping.

The length of delay is limited to a time required to process overlapping access requests in the request queue ahead of the subsequently received access requests, in one embodiment.

In method 1000, non-overlapping access requests are processed from the request queue concurrently without delay, since the data in the CBD for these access requests will not adversely affect data integrity in the CBD.

Moreover, in method 1000 according to one embodiment, individual overlapping access requests are processed serially in an order in which they were entered in the request queue, thereby ensuring that data integrity is maintained.

In one embodiment, only write requests are delayed and read requests are not delayed. In this embodiment, method 1000 may further include processing the read requests concurrently with the write requests, thereby ensuring no delay in the processing of the read requests.

A read request from the plurality of access requests returns data from any write requests entered into the request queue previous to the read request when the overlapping read requests are delayed with the overlapping write requests.

However, in this embodiment, read request from the plurality of access requests may return old data, new data, or a combination of old/new data, depending on whether any write requests that are delayed will affect the data for the read requests.

For a CBD that has no outstanding active I/O, then this CBD is committed, as all metadata associated with data written to the cache storage device is current in the CBD. Any received access request will be indicated as an uncommitted CBD, as this new access request needs to be resolved before the metadata may be stored regarding the new access request. However, with no other access requests being in queue ahead of the new access request, in one embodiment, this operation proceeds without delay and the CBD is committed once the metadata is written in the CBD.

For a CBD that has active concurrent I/O, each of the access requests that are concurrently pending creates a corresponding uncommitted CBD entry in the chain of committed and uncommitted CBD. The entry is inserted into the chain of committed and uncommitted CBD at the end of the chain. In one embodiment, I/O is processed from a beginning of the chain of committed and uncommitted CBD, thereby ensuring that any access request inserted at the end of the chain of committed and uncommitted CBD will be last to be processed. However, because non-overlapping requests are allowed to proceed, while overlapping requests are delayed and serialized, some entries in the chain of committed and uncommitted CBD may complete prior to some earlier entries. Therefore, the committed or uncommitted status is utilized to determine which entries are still pending to be resolved, while maintaining the ordering over time.

Moreover, for any committed CBD that has at least one entry in the chain of committed and uncommitted CBD, the committed CBD is locked, thereby serializing I/O operations on the CBD so that data integrity is ensured in face of the concurrent I/O operations. This lock helps to serialize the insertion order into the request queue, and ensures that metadata changes to the CBD are processed according to the insertion order in the chain of committed and uncommitted CBD.

Then, according to one embodiment, non-overlapping access requests are performed with actual data reads and/or writes (real I/O), while any other access requests are blocked until the overlapping requests ahead of them in the chain of committed and uncommitted CBD are resolved. Resolution of an access request may comprise the request being cleaned up (removed from the chain), the CBD reaching a safe state (a state where other concurrent operations may proceed), or some other resolution known in the art.

In a further embodiment, the blocked requests in the chain of committed and uncommitted CBD are delayed for a bounded (limited) amount of time, and a decision as to whether to proceed with any of these access requests may be periodically determined, or the blocked requests may be delayed until a signal is received indicating that the operation may proceed. This time period to wait is based solely on the number of overlapping requests ahead of it in the chain of committed and uncommitted CBD, thereby bounding the waiting period.

In one embodiment, concurrent read/write/destage requests to the same CBD are serialized, in which every I/O request is inserted in the chain, with non-overlapping requests being allowed to proceed, and overlapping requests being processed in order of insertion into the chain.

In an alternate embodiment, weaker consistency guarantees may be provided in the data storage system. In this embodiment, some or all reads may not be blocked, and therefore the data returned is not guaranteed to be the most recent data, as changes may be waiting in the chain for processing that will affect the data returned. Moreover, a read miss may proceed without a recheck in the cache storage device, as anything that changes during the read from the back-end storage device is concurrent and need not be blocked. Moreover, overlapping concurrent writes are serialized in this embodiment for correctness.

A data storage system that utilizes a multi-grained cache will benefit from the use of a defragmentation module to reclaim cache space that is freed when moving small chunks of data into and out of the cache storage device, in accordance with this embodiment. The defragmentation module is configured to maintain availability of metadata structures for different chunk sizes in the cache storage device, and to improve efficiency of destaging large chunks of data from the cache storage device (sending the data to the back-end storage device to be stored therein). Data from consecutive back-end storage device data blocks may get fragmented within the cache address space based on allocation decisions that affect where data is stored in the cache storage device for different write requests.

Therefore, in order to more efficiently manage data on the cache storage device, an efficient cache space defragmentation module for the multi-grained cache storage device is described according to several embodiments herein, that maintains the availability of metadata structures in the cache storage device for future allocations as well as improves the efficiency of destaging data from the cache storage device. The defragmentation module, according to one embodiment, is configured to execute defragmentation operations on CBDs in as background tasks.

According to one embodiment, the defragmentation module is configured to co-located all cached blocks of a CBD in the cache address space. The defragmentation module improves both read hit and destager read I/O requirements by reducing the number of I/Os required to read requested data. Moreover, the defragmentation module helps to replenish the free pool of FBDs by returning FBDs that have been freed up due to defragmentation operations, allowing the cache space allocator module to allocate a selected size of FBD to new write requests, which ensures that oversized FBDs are not assigned to new writes.

Figure 11:
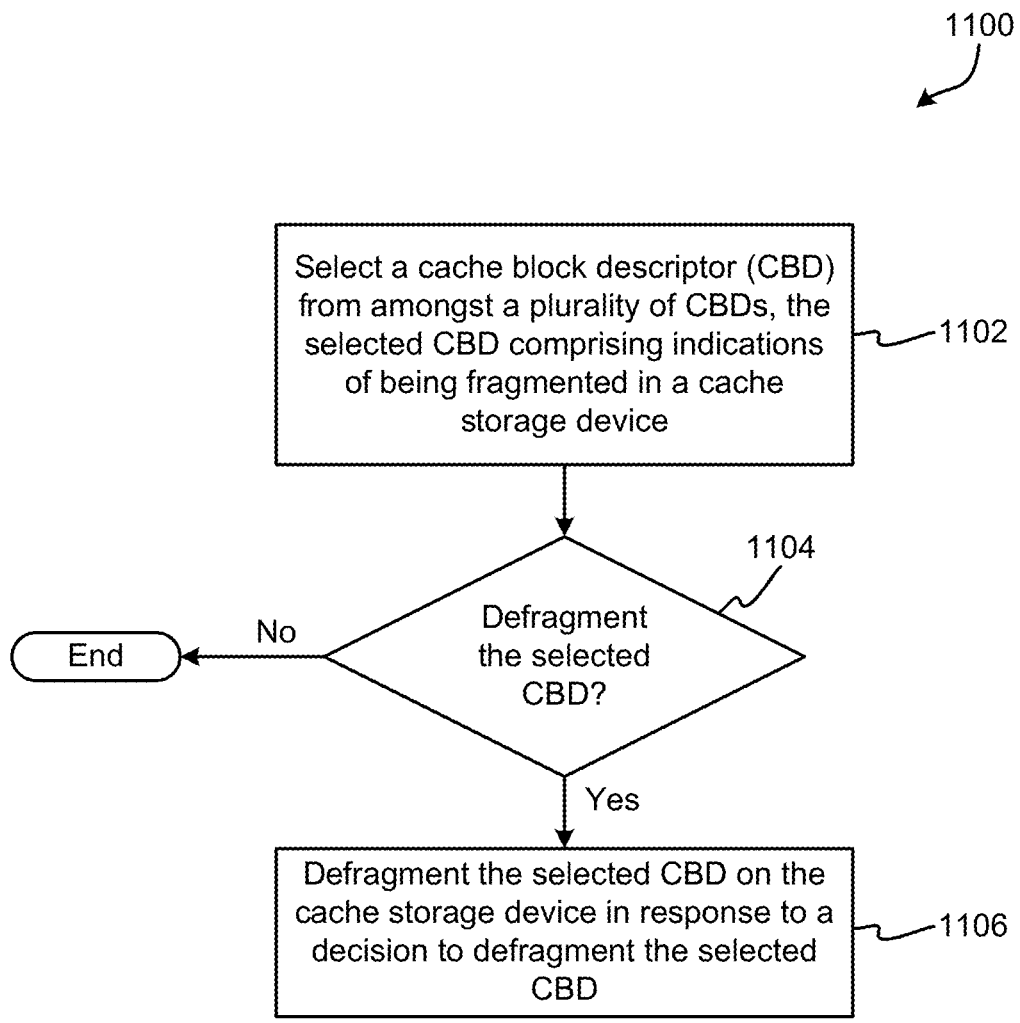
FIG. 11 is a flowchart of a method, according to one embodiment.

Now referring to FIG. 11, a flowchart of a computer-implemented method 1100 for performing defragmentation operations in a multi-grained writeback cache is shown according to one embodiment. The method 1100 may be performed in accordance with the present invention in any of the environments depicted herein, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a controller, a processor, a data storage system, a server, and/or some other processing unit described herein, alone or in combination with other software and/or hardware, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a CPU, an ASIC, a FPGA, etc., combinations thereof, or any other suitable computing device known in the art.

In method 1100, it is assumed that a plurality of CBDs are used to store data to a cache storage device, with each CBD having a plurality of FBDs allocated thereto for fine-grained mapping of the data stored to the cache storage device.

As shown in FIG. 11, method 1100 may initiate with operation 1102, where a CBD is selected that has indications of having fragmentation as stored in the cache storage device. Typically, this fragmentation is indicated by the FBDs used to store the data of the CBD to the cache storage device. In some embodiments, a substantial amount of fragmentation is looked for from the CBD, such that lesser amounts of fragmentation are ignored unless there are no CBDs having a lot of fragmentation to choose from.

In some embodiments, there is a threshold amount of fragmentation that must be discovered prior to continuing to execute method 1100.

One indicator of the level of fragmentation is a number of FBDs allocated to the CBD, as more FBDs allows for and may suggest greater fragmentation. In order to make this determination, a threshold number of FBDs may be compared against the number allocated to the selected CBD. In response to the number of FBDs allocated for the selected CBD being greater than or equal to the threshold number, the defragmentation module may conclude that the selected CBD is substantially fragmented. In response to the number of FBDs allocated for the selected CBD being less than the threshold number, the defragmentation module may conclude that the selected CBD is not substantially fragmented.

Another indicator of the level of fragmentation is the size of the various FBDs allocated to the CBD, as smaller FBDs may be an indicator of greater fragmentation, as this data is clearly stored in smaller chunks, as opposed to larger FBDs. In order to make this determination, a median or average size of all FBDs allocated to the CBD may be compared against a threshold size. In response to the average or median size being less than the threshold size, the defragmentation module may conclude that the selected CBD is substantially fragmented. In response to the average or median size being greater than or equal to the threshold size, the defragmentation module may conclude that the selected CBD is not substantially fragmented.

In operation 1104, it is determined whether to defragment the selected CBD on the cache storage device. This decision may be based on one or more relevant factors relating to FBDs allocated to the CBD on the cache storage device.

In one embodiment, utilization of the FBDs allocated to the selected CBD may be used to determine whether to defragment the selected CBD. This decision is effected by the utilization of the FBDs, as FBDs having a lower utilization rate may be better candidates for defragmentation as opposed to FBDs having a relatively higher utilization rate. This is because FBDs that are not being used very frequently may soon slip into a state where they are candidates for destaging. By pre-emptively grouping these rarely used FBDs into larger chunks, the destaging process becomes more efficient.

In another embodiment, in response to a determination that a FBD free pool is low on available resources (available FBDs), a CBD that has high utilization of that free pool may be selected for defragmentation in order to replenish the FBD free pool with available FBDs that are freed up in the defragmentation process.

According to one embodiment, the metadata that is used to determine the level of fragmentation of the selected CBD in operation 1104 may be the same metadata that is used to determine that the FBD free pool is low on available FBDs. In an alternate embodiment, other metadata and/or indicia of low resources within the FBD free pool may be used to make this determination.

In operation 1106, the selected CBD is defragmented on the cache storage device in response to a decision to defragment the selected CBD. This defragmentation process causes data stored in at least some FBDs stored to the cache storage device that are allocated to the selected CBD to be merged together to form larger chunks of data.

In one embodiment, to effect this defragmenting, the selected CBD may be set to a MERGING mode. In the MERGING mode, two options are possible, which are not mutually exclusive, as each may be used alone or in combination according to some embodiments: 1) the selected CBD is allocated one or more new FBDs with which to merge data from other existing FBDs of the selected CBD, thereby allowing the existing FBDs to be freed up; and 2) valid data from existing FBDs that are lightly utilized (e.g., sparsely filled) is merged with valid data from other underutilized FBDs for the selected CBD. This merge is not performed on FBDs that have invalid data therein, so that the merged FBDs all have valid data therein at the conclusion of the merging.

In one embodiment, sparsely filled FBDs may exist in the cache storage device as a result of the cache space allocator deciding to allocate new FBDs with larger chunks of data, without first completely filling existing FBDs with data. The cache space allocator may make this decision to maintain contiguity of data being written to the cache storage device, rather than spread the data across multiple FBDs.

In another embodiment, sparsely filled FBDs may exist in the cache storage device as a result of data being read from the cache storage device and being written to a new FBD as a result of some change taking place which invalidates the old FBD(s). The cache allocation bitmap is updated to reflect such a change, but it results in sparsely filled FBD(s). In this embodiment, in a further approach, any read requests may be allowed to proceed during this read/write process without delay.

In accordance with another embodiment, a determination may be made as to whether the data to be read is already in-memory as part of the merging process. In response to a determination that the data to be read is already in-memory, a read operation on the cache storage device may be avoided entirely.

In another embodiment, in response to a determination that a size of a data chunk for a CBD is equal to a back-end block size, then the data chunk for the CBD is sent it to a destager module for destaging operations instead of sending it to the defragmentation module. In a further embodiment, the data chunk for the CBD may be sent to the destager module only when more block-sized FBDs are desired in the block size FBD free pool.

In the event that a failure occurs in a typical data storage system that stores data to a back-up storage device and a back-up storage device, recovery operations are complicated by the presence of possibly more than one copy of data, and possibly different states of the data depending on storage location. Recovery from a failure of one or more cache servers may result in a long downtime, which is highly undesirable.

This is because in conventional data storage systems, the metadata footprint for any cache server is large and grows proportionally larger in response to cache address space and back-end address space increases.

Fail-over and fail-back in conventional data storage systems typically requires reading the complete metadata footprint from storage into the cache server memory, which takes a very long time. Therefore, it is beneficial to reduce the time needed to read the cache metadata footprint in order to perform recovery on a cache server, which in turn will decrease the downtime or degraded mode of operation using on-demand reads for an indexed and multi-grained caching framework. On-demand reads of CBDs from the cache address space for first read/write I/O to a data block results in instantaneous recovery after a primary failover, in one embodiment. Moreover, in another embodiment, CBDs may be indexed, and a CBD usage frequency (heat) map may be created, that enables lower reads and/or writes on critical paths in the degraded mode of operation.

According to one embodiment, fail-over from a primary cache server to a secondary cache server may take place in a seamless manner. The secondary cache server is informed of the failure of the primary cache server and transitions into a BY-PASS mode when handing requests for the back-up storage device. Moreover, the secondary cache server does not read in primary's complete metadata footprint, instead the secondary cache server services new I/O requests, which provides instant recovery while operating in a degraded mode.

This arrangement and fail-over protocol results in minimum impact on I/O performance and memory usage of the secondary cache server while operating in the degraded mode. The secondary cache server is also configured to provide on-demand service to the primary cache server's data blocks while operating in degraded mode, which is a graceful use of the secondary server's memory footprint.

Moreover, in one embodiment, this arrangement restricts any read requests and/or write requests directed to the primary cache server's data blocks stored to the back-end storage device to be serviced as an on-demand read of either: an index of the CBD, the index and the entire CBD, or the index and a limited number of frequently utilized portions of the CBD recovered from the back-up storage device. This results in minimal impact on I/O performance.

According to embodiments described herein, there are three possible recovery options during fail-over in this arrangement:

1) The CBD index is read along with the complete CBD metadata footprint that includes all CBDs managed by the primary cache server. However, this option utilizes a large memory footprint and results in a long downtime while in degraded mode on the secondary cache server. This option, however, has no impact on read/write performance after the initial downtime.

2) The CBD index is read with on-demand reads being performed on the CBD. Reads that were intended for the primary cache server prior to the failure may be serviced as they would have been serviced by the primary cache server without any read miss reinserts into the cache storage device. This avoids the CBD from being updated on the read path, which may lead to the wrong data being read back. Any writes to the cache storage device invalidates the CBD, and causes the CBD to be updated in the cache storage device, which will be reflected in the cache allocation bitmap. This results in fewer valid/dirty marks in the cache allocation bitmap. Also, this approach only utilizes one cache read (of the CBD) plus a cache read/write, plus one cache write (the CBD again) in response to the CBD being updated.

3) The CBD index is read along with a predetermined number of the most utilized CBDs managed by the primary cache server prior to the failure in the cache storage device. This results in one less cache read for CBDs that also have a write associated therewith.

Figure 12:
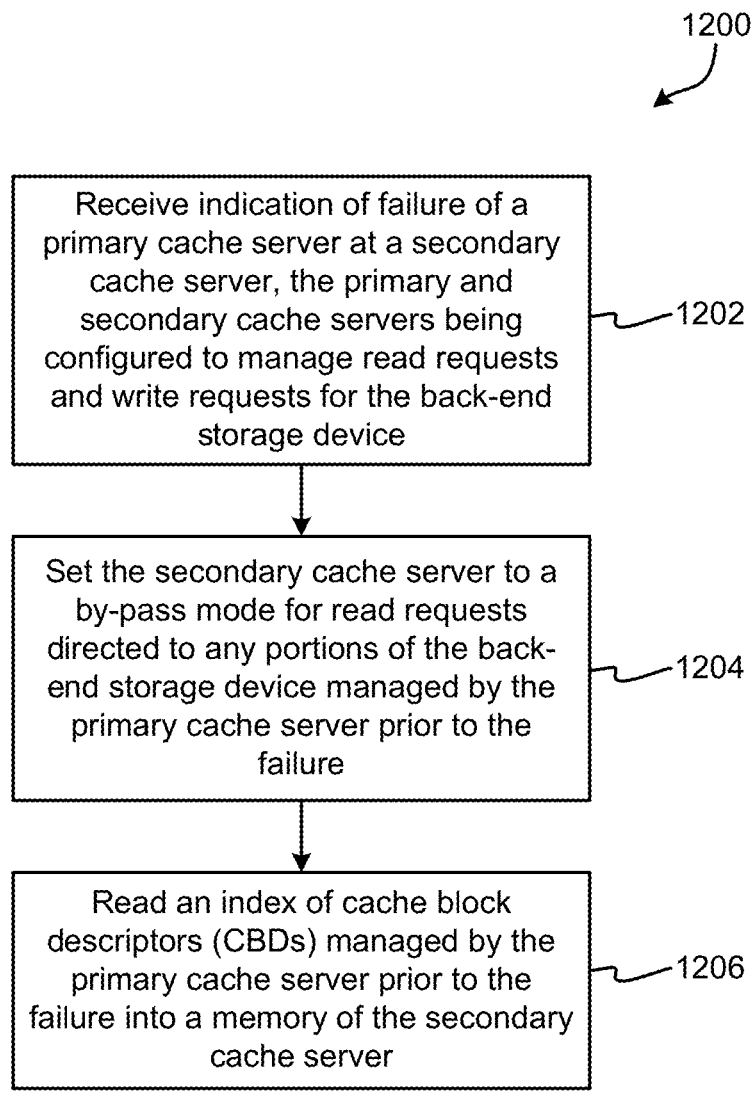
FIG. 12 is a flowchart of a method, according to one embodiment.

Now referring to FIG. 12, a flowchart of a computer-implemented method 1200 for fail-over operation in a multi-grained caching framework is shown according to one embodiment. The method 1200 may be performed in accordance with the present invention in any of the environments depicted herein, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a controller, a processor, a data storage system, a server, and/or some other processing unit described herein, alone or in combination with other software and/or hardware, or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a CPU, an ASIC, a FPGA, etc., combinations thereof, or any other suitable computing device known in the art.

In method 1200, it is assumed that a plurality of CBDs are used to store data to a cache storage device, with each CBD having a plurality of FBDs allocated thereto for fine-grained mapping of the data stored to the cache storage device.

As shown in FIG. 12, method 1200 may initiate with operation 1202, where indication of failure of a primary cache server is received at a secondary cache server. The primary and secondary cache servers are configured to manage read requests and write requests for a back-end storage device that stores data. In a further embodiment, the primary and secondary cache servers may be configured to manage read requests and write requests for a cache storage device.

In operation 1204, the secondary cache server is set to a by-pass mode for read requests directed to any portions of the back-end storage device managed by the primary cache server prior to the failure. These portions of the back-end storage device managed by the primary cache server prior to the failure may be determined from a CBD index read into memory in operation 1206.

In operation 1206, an index of CBDs managed by the primary cache server prior to the failure are read into a memory of the secondary cache server.

Method 1200 may further include receiving at the secondary cache server a read request directed to at least one CBD managed by the primary cache server prior to the failure. To respond to this read request, an on-demand read of the at least one CBD referenced in the read request is performed and data associated with the at least one CBD is stored to the memory of the secondary cache server. Moreover, the read request is responded to using the data associated with the at least one CBD by the secondary cache server instead of the primary cache server. In a further approach, no read miss reinserts are placed into the cache storage device.

Method 1200 may also include invalidating a first CBD in a cache allocation bitmap in response to a write request being serviced by the secondary cache server on any data associated with the first CBD in the cache storage device, according to one embodiment.

In another embodiment, method 1200 may further include determining a predetermined number of most utilized CBDs managed by the primary cache server prior to the failure. These CBDs are determined to be related to the hottest of the data, thereby being accessed more frequently than all other data managed by the primary cache server. The most utilized CBDs are read into the memory of the secondary cache server for use in responding to future read requests.

Moreover, method 1200 may further include receiving, at the secondary cache server, a read request directed to at least one CBD managed by the primary cache server prior to the failure. In response to such a read request, it is determined whether the at least one CBD is stored in the memory of the secondary cache server. The read request is responded to using data from the memory of the secondary cache server in response to a determination that the at least one CBD is stored in the memory of the secondary cache server. Alternatively, the at least one CBD is retrieved from the back-end storage device and the read request is responded to using data from the back-end storage device in response to a determination that the at least one CBD is not stored in the memory of the secondary cache server.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
  a cache storage device; and
  a processor and logic integrated with and/or executable by the processor, the logic being configured to:
    receive a write request comprising data to be written to the cache storage device;
    determine a size of the write request;
    select a chunk size from among a plurality of chunk sizes designated for storing data in the cache storage device;
    allocate a fine block descriptor (FBD) having the selected chunk size to the write request;
    invalidate existing data stored to the cache storage device that includes at least a portion of the data of the write request in response to a determination that the portion of the data of the write request exists in the cache storage device; and
    send the write request to a controller configured to manage a back-end storage device in response to failing to create the FBD having the selected chunk size.

2. The system as recited in claim 1, wherein the logic is further configured to update a cache allocation bitmap to indicate invalidation of the existing data stored to the cache storage device in response to the invalidation of the existing data stored to the cache storage device.

3. The system as recited in claim 1, wherein the logic is further configured to select a chunk size that is large enough to store the data of the write request and no greater in size than a next larger chunk size of the plurality of chunk sizes available for storing data in the cache storage device.

4. The system as recited in claim 1, wherein the logic is further configured to:
  write the data to the FBD in the cache storage device;
  store metadata about the written data in the FBD; and
  update a cache allocation bitmap according to an address of the written data.

5. The system as recited in claim 1, wherein the logic is further configured to consider an amount of space in the cache storage device currently allocated for a cache block descriptor (CBD) corresponding to the write request and a utilization of the space in the cache storage device in selecting the chunk size.

6. The system as recited in claim 1, wherein the logic is further configured to limit a number or a total size of FBDs allocated to a single cache block descriptor (CBD), and wherein the plurality of chunk sizes comprises three or more chunk sizes.

7. The system as recited in claim 1, wherein the logic is further configured to dynamically create the FBD having the selected chunk size in response to no FBDs having the selected chunk size being available in the cache storage device.

8. A computer-implemented method, comprising:
  receiving a write request comprising data to be written to a cache storage device;
  determining a size of the write request;
  selecting a chunk size from among a plurality of chunk sizes designated for storing data in the cache storage device;
  allocating a fine block descriptor (FBD) having the selected chunk size to the write request; and
  sending the write request to a controller configured to manage a back-end storage device in response to failing to create the FBD having the selected chunk size.

9. The method as recited in claim 8, further comprising invalidating existing data stored to the cache storage device that includes any portion of the data of the write request.

10. The method as recited in claim 9, further comprising updating a cache allocation bitmap to indicate invalidation of the existing data stored to the cache storage device in response to a determination that any portion of the data of the write request exists in the cache storage device.

11. The method as recited in claim 8, further comprising selecting a chunk size that is large enough to store the data of the write request and no greater in size than a next larger chunk size of the plurality of chunk sizes available for storing data in the cache storage device.

12. The method as recited in claim 8, further comprising:
  writing the data to the FBD in the cache storage device;
  storing metadata about the written data in the FBD; and
  updating a cache allocation bitmap according to an address of the written data.

13. The method as recited in claim 8, further comprising considering an amount of space in the cache storage device currently allocated for a cache block descriptor (CBD) corresponding to the write request and a utilization of the space in the cache storage device in selecting the chunk size.

14. The method as recited in claim 8, further comprising limiting a number or a total size of FBDs allocated to a single cache block descriptor (CBD).

15. The method as recited in claim 8, further comprising dynamically creating the FBD having the selected chunk size in response to no FBDs having the selected chunk size being available in the cache storage device.

16. A computer program product, the computer program product comprising a computer readable storage medium having program instructions embodied therewith, wherein the computer readable storage medium is not a transitory signal per se, the embodied program instructions readable/executable by a controller to cause the controller to:
  receive, by the controller, a write request comprising data to be written to a cache storage device;
  determine, by the controller, a size of the write request;
  select, by the controller, a chunk size from among a plurality of chunk sizes designated for storing data in the cache storage device;
  allocate, by the controller, a fine block descriptor (FBD) having the selected chunk size to the write request; and
  send, by the controller, the write request to a second controller configured to manage a back-end storage device in response to failing to create the FBD having the selected chunk size.

17. The computer program product as recited in claim 16, wherein existing data stored to the cache storage device that includes any portion of the data of the write request is invalidated, and wherein the embodied program instructions are further readable/executable by the controller to update a cache allocation bitmap to indicate invalidation of the existing data stored to the cache storage device in response to a determination that any portion of the data of the write request exists in the cache storage device.

18. The system as recited in claim 4, wherein the metadata is selected from the group consisting of: heat information relating to the written data, validity information relating to whether data stored to a back-end storage device is up-to-date in comparison with the written data, and a density of the written data.

* * * * *